(12) United States Patent
Vannuffel et al.

(10) Patent No.: US 9,329,472 B2
(45) Date of Patent: May 3, 2016

(54) METHOD FOR MANUFACTURING EUV MASKS MINIMIZING THE IMPACT OF SUBSTRATE DEFECTS

(71) Applicant: COMMISSARIAT A L'ENERGIE ATOMIQUE ET AUX ENERGIES ALTERNATIVES, Paris (FR)

(72) Inventors: Cyril Vannuffel, Grenoble (FR); Jean-Louis Imbert, Seyssinet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 16 days.

(21) Appl. No.: 13/970,252

(22) Filed: Aug. 19, 2013

(65) Prior Publication Data

US 2015/0024307 A1 Jan. 22, 2015

(30) Foreign Application Priority Data

Aug. 20, 2012 (FR) ...................................... 12 57892

(51) Int. Cl.
*G06F 17/50* (2006.01)
*G03F 1/72* (2012.01)
*G03F 1/24* (2012.01)
*G06T 7/00* (2006.01)
*G03F 1/22* (2012.01)

(52) U.S. Cl.
CPC ... *G03F 1/72* (2013.01); *G03F 1/22* (2013.01); *G03F 1/24* (2013.01); *G06F 17/50* (2013.01); *G06F 2217/12* (2013.01); *G06T 7/0006* (2013.01)

(58) Field of Classification Search
CPC ............... G03F 1/22; G03F 1/24; G03F 1/72; G06F 17/50; G06F 2217/12; G06T 7/0006
USPC .......................................... 716/51–54; 430/5
See application file for complete search history.

(56) References Cited

U.S. PATENT DOCUMENTS 6,593,036 B1 * 7/2003 Robic et al. ........................ 430/5
6,686,099 B2 * 2/2004 Tanaka et al. ..................... 430/5

(Continued)

OTHER PUBLICATIONS

Clifford et al., "Compensation Methods for Buried Defects in Extreme Ultraviolet Lithography Masks", Pro. of SPIE, SPIE International Society for Optical Engineering, US, vol. 7636, vol. 21 Feb. 21, 2010, pp. 763623-1 through 763623-8.

(Continued)

*Primary Examiner* — Helen Rossoshek
(74) *Attorney, Agent, or Firm* — Baker & Hostetler LLP

(57) ABSTRACT

In the production of extreme ultraviolet photolithography masks, to produce a set of masks: mask blanks possibly containing defects are provided; an individual map of positions of defects in each mask blank is produced; a concatenated map of defects in a number of masks is produced by transposing, to a given useful zone common to all masks, positions of defects detected during mapping of various mask blanks; individual defect zones each associated with a respective defect and encircling said defect are defined; depending on design rules and on structure to be produced, an electronic version of layouts of the masks is produced, taking account locally, in the design rules, of the existence of each defect in the concatenated map to prevent critical elements from being placed in defect zones; and each mask is produced from any one of the mask blanks and with a respective layout thus obtained.

16 Claims, 2 Drawing Sheets

(56) References Cited

U.S. PATENT DOCUMENTS

| | | | | |
|---|---|---|---|---|
| 6,765,673 | B1* | 7/2004 | Higashikawa | 356/399 |
| 7,226,705 | B2* | 6/2007 | Hata | 430/5 |
| 7,303,842 | B2* | 12/2007 | Watson et al. | 430/5 |
| 7,794,900 | B2* | 9/2010 | Okubo | G03F 1/38 430/322 |
| 7,923,177 | B2* | 4/2011 | Charpin-Nicolle | 430/5 |
| 7,927,765 | B2* | 4/2011 | Quesnel | 430/5 |
| 7,927,766 | B2* | 4/2011 | Barrett et al. | 430/5 |
| 8,039,178 | B2* | 10/2011 | Tanabe et al. | 430/5 |
| 8,206,889 | B2* | 6/2012 | Tanaka | 430/270.1 |
| 8,458,623 | B1* | 6/2013 | Wagner | 716/51 |
| 8,609,304 | B2* | 12/2013 | Tanabe et al. | 430/5 |
| 8,637,213 | B2* | 1/2014 | Hashimoto et al. | 430/5 |
| 8,711,346 | B2* | 4/2014 | Stokowski | 356/237.2 |
| 8,726,202 | B2* | 5/2014 | Wagner | 716/54 |
| 8,785,082 | B2* | 7/2014 | Xiong et al. | 430/5 |
| 8,802,334 | B2* | 8/2014 | Yamada et al. | 430/5 |
| 8,953,869 | B2* | 2/2015 | Nasser-Ghodsi et al. | 382/141 |
| 9,002,497 | B2* | 4/2015 | Volk et al. | 700/121 |
| 2007/0158636 | A1* | 7/2007 | Tezuka | 257/10 |
| 2008/0081385 | A1* | 4/2008 | Marella et al. | 438/14 |
| 2009/0297988 | A1* | 12/2009 | Tanaka | 430/319 |
| 2011/0159410 | A1* | 6/2011 | Lin et al. | 430/5 |
| 2011/0161893 | A1* | 6/2011 | Lin et al. | 716/52 |
| 2011/0231134 | A1* | 9/2011 | Yoshitake | 702/94 |
| 2012/0238096 | A1* | 9/2012 | Xiong et al. | 438/694 |
| 2012/0258388 | A1* | 10/2012 | Yamada et al. | 430/5 |
| 2012/0322000 | A1* | 12/2012 | Uno et al. | 430/5 |
| 2013/0017475 | A1* | 1/2013 | Terasawa et al. | 430/5 |
| 2013/0273463 | A1* | 10/2013 | Wagner | 430/5 |
| 2014/0106263 | A1* | 4/2014 | Utzny | 430/5 |

OTHER PUBLICATIONS

Zhang et al., "Efficient Pattern Relocaiton for EUV Blank Defect Mitigation", Design Automation Conference (ASP-DAC), 2012 17th Asia and South Pacific, IEEE, Jan. 30, 2012, pp. 719-724.

Du et al., "EUV Mask Preparation Considering Blank Defects Mitigation", Proc. of SPIE, vol. 8166, Sep. 19, 2011, pp. 816611-1 through 816611-11.

Du et al., "Efficient Multi-die Placement for Blank Defect Mitigation in EUV Lithography", Proc. of SPIE, vol. 8322, Feb. 12, 2012, pp. 832231-1 through 832231-10.

* cited by examiner

METHOD FOR MANUFACTURING EUV MASKS MINIMIZING THE IMPACT OF SUBSTRATE DEFECTS

CROSS-REFERENCE TO RELATED APPLICATION

This application claims priority to foreign French patent application No. FR 1257892, filed on Aug. 20, 2012, the disclosure of which is incorporated by reference in its entirety.

FIELD OF THE INVENTION

The invention relates to the manufacture of masks intended for extreme ultraviolet (EUV) photolithography. The wavelengths in question are shorter than 20 nanometers in length and are typically 13.5 nm or 6.8 nm in length. The invention may also apply to any wavelength. The use of these wavelengths is intended to allow patterns to be produced with smaller dimensions than those that can be produced using deep ultraviolet (DUV) or visible-light photolithography.

BACKGROUND

EUV masks have the particularity that they are used in reflection and not in transmission. They are reflective at the working EUV wavelength, i.e. the wavelength that will be used with this mask to implement the corresponding photolithography operations. Moreover, binary EUV masks comprise a pattern of zones that are absorbent at the working EUV wavelength. Phase-shift EUV masks comprise a pattern of phase-shifting zones. To simplify the description, only binary masks will be considered hereinbelow, although the invention is equally applicable to phase-shift masks.

In use, the mask is irradiated by an EUV source and reflects this radiation except in the absorbent zones where the light is absorbed and cannot be reflected. The EUV irradiation, at a precisely set wavelength, is spatially modulated by this pattern and is projected by mirror-comprising focusing optics onto an area to be exposed. The area to be exposed is a layer of EUV-sensitive resist deposited on a flat substrate. This layer covers the layers to be etched or treated (implanted, for example) after exposure of the resist to EUV radiation. After the resist has been developed in a chemical developer, a structure is obtained in which the layers to be etched or implanted are covered with a resist pattern that protects certain zones and exposes other zones.

The projecting optics reduces the image and allows smaller patterns than those etched in the mask to be defined in the resist. The reduction ratio is generally four. The mask is in general manufactured using an electron beam writing method.

Typically, a binary mask to be used in reflection is composed of a flat substrate with a low expansion coefficient covered with a reflective structure, in practice a Bragg mirror, i.e. a structure comprising multiple transparent layers of different refractive indices. The thicknesses of these layers are calculated, depending on the refractive indices, the wavelength, and the angle of incidence of the EUV beam, so that the various partially reflective interfaces reflect light waves that are in phase with one another. The mirror is covered with an absorbent layer etched with the desired masking pattern, such that the mask comprises reflective zones (the parts of the mirror not covered with absorber) and absorbent zones (the parts of the mirror covered with absorber). By way of example, for a wavelength of 13.5 nm and an angle of incidence of 6 degrees, silicon layers that are 41.5 angstroms in thickness will be used in alternation with molybdenum layers that are 28 angstroms in thickness (1 angstrom=0.1 nm). The absorbent zones may be made of (inter alia) chromium deposited on the mirror; for example, a layer of 600 angstroms of chromium placed on top of the mirror reflects only 1% of the incident light.

A substrate comprising a multilayer mirror and a uniform (therefore still unetched) absorbent layer over its entire surface is called a "mask blank". The mask blank is etched with a desired pattern in order to form an EUV photolithography mask. The small size of the masking patterns to be produced by EUV photolithography means that defects in the mask blank may lead to completely unacceptable defects in the structure produced by photolithography. Defects as small as a few tens of nanometers in size in the mask may result in defective features possibly resulting in unusable structures.

The defects in the mask blank may result from defects on the surface of the mask blank or even defects introduced during the formation of the multiple layers of the Bragg mirror, or lastly may result from defects, such as scratches, holes and bumps, on the surface of the underlying substrate itself, which defects propagate into the multilayer structure and cause defects in the mirror. These defects are amplitude defects (absorbent zones that should be reflective and vice versa), or optical phase defects (introducing an unwanted phase shift when the photolithography light penetrates into the layers of the mask, locally degrading the reflection coefficient).

To give an idea of the order of magnitude involved: the objective is to produce a mask containing a number of defects greater than or equal to 60 nm in size smaller than 0.01 defects per $cm^2$. However, with existing technologies this is still not possible at the present time.

It has already been suggested to correct for defects in the following way: produce an individual map of the defects in each mask blank used to manufacture the series of masks required to produce a structure (for example a semiconductor wafer comprising multiple microelectronic circuits). A number of masks is required, each mask corresponding to one of the various etching or implantation operations to be carried out on the structure. The defects in a series of mask blanks are detected using commercially available tools, the position and the size of the defects in each mask blank being recorded.

A software package determines which mask blanks are usable for the various masks depending on the layout of the various levels of the circuit to be produced, and introduces small offsets in X or in Y or small rotations of the masks so that eventual defects in the mask blanks are moved beyond the layouts of the structure (or at least away from the most critical zones of these layouts).

In the case of a mask containing many defects, it is difficult, using this method, to find a solution that allows all of these defects to be placed in an absorbent zone because there is only a small chance that it will be possible to locate all the various defects in a mask in non-critical locations when only two degrees of freedom X,Y in translation in the plane of the mask and one degree of freedom in rotation in this plane are available.

SUMMARY OF THE INVENTION

In order to better avoid most of the defects, the invention provides a method for producing a set of N masks for producing a structure via at least N photolithography operations, which method comprises the following operations:

providing a set of N (N being an integer greater than 1) mask blanks possibly containing defects;

producing an individual map of the positions of the defects in each mask blank using an inspection machine;

producing a concatenated map of the defects in a number of masks by transposing, to a given useful zone common to all the masks, the positions of the defects detected during mapping of the various mask blanks;

defining individual defect zones each associated with a respective defect and encircling said defect;

producing, depending on the design rules and on the structure to be produced, an electronic version of the layouts (or design) of the N masks, taking account locally, in the design rules, of the existence of each defect in the concatenated map in order to prevent critical elements from being placed in defect zones; and producing each of the masks from any one of the mask blanks and with a respective layout thus obtained.

In other words, the software package used to design the mask includes design rules that prevent elements, or at least certain critical circuit elements, from being placed not only in defect zones of the mask blank corresponding to the mask to be produced, but also in the defect zones of the other mask blanks. These design rules calculate and draw as required modified layouts that avoid or bypass the defect zones. For example, a narrow conductor will be designed to pass around rather than through a defect zone because otherwise there would be a risk of it becoming severed.

In addition, as a given mask may contain a given layout repeated a number of times, for example in order to produce two or four or even more integrated circuit chips from a given set of masks, provision is preferably made for the concatenated map for the mask area corresponding to a single chip to include the relative positions of the defects in the mask-blank areas corresponding to the other chips. There is then a double concatenation: concatenation of the defects in the various masks and concatenation of the defects in the various areas repeated a number of times over a given mask. More generally, if the set of N masks serves to produce, in a single photolithography operation, P identical structures, the concatenated map for the mask area corresponding to a single structure includes the relative positions of the defects in the mask-blank areas corresponding to the P−1 other structures.

Lastly, since the lifetime of the masks may be limited, it may be necessary to manufacture a new set of N masks from layouts designed for the first set. In this case, during design of the layouts, several sets of mask blanks are mapped in advance and a concatenated defect map including not only all the defects in the various masks of a set but also the defects in the various mask blanks of one or more other sets is produced. More generally, the concatenated map includes the defects in a number of mask blanks higher than N, with a view to manufacturing masks for replacing worn masks without modifying the layouts of the masks produced.

It will be understood that this process requires the mask blanks to be manufactured and inspected for defects before the mask design or layout is created, the opposite conventionally being the case.

The layout modification associated with the presence of a defect may be of a number of types: transfer of a small circuit block to a location free from defects; transfer of layout elements, especially conductive portions, to a location free from defects, and in particular modification of a conductive track so that it passes around a defect zone; or even production of a conductive bypass around a defect zone, the original conductive track that passes through the defect zone remaining in place.

BRIEF DESCRIPTION OF THE DRAWINGS

Other features and advantages of the invention will become apparent on reading the detailed description that follows and that is given with reference to the appended drawings, in which.

DETAILED DESCRIPTION

Figure 1:
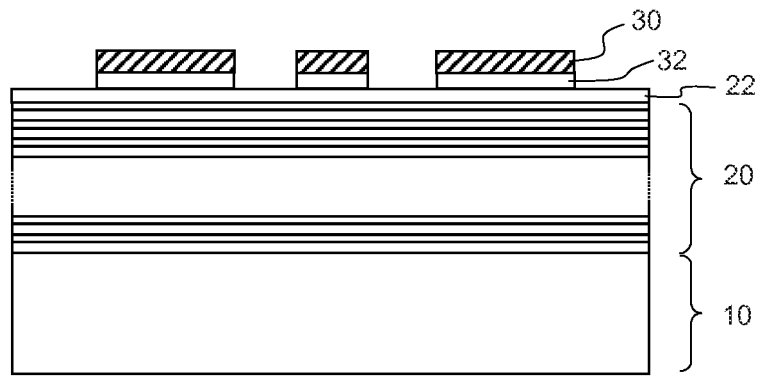
FIG. 1 shows a binary EUV mask structure comprising a pattern of absorbent zones.

FIG. 1 shows the general structure of a binary extreme ultraviolet photolithography mask for use in reflection.

The mask comprises a substrate 10 having a low thermal expansion coefficient. It is uniformly covered with a thin-film multilayer 20 forming a Bragg mirror at the EUV wavelength at which the mask is to be used and at the angle of incidence (in general about 6°) at which the EUV light will irradiate it. The multilayer is most often an alternation of silicon and molybdenum films. The thickness of the silicon films and the thickness of the molybdenum films are chosen, taking into account the respective refractive indices of silicon and molybdenum, so that the light reflected at each interface between two films interferes constructively. The multilayer behaves like a mirror with a high coefficient of reflection for the incident EUV light.

The multilayer 20 is covered with a layer 30 that absorbs the EUV light and that is locally etched to define a desired photolithography pattern. The absorbent layer may be made of chromium. A buffer layer 32, which may be made of silicon oxide, may be provided between the multilayer 20 and the absorbent layer 30. The buffer layer notably serves as an etch stop layer allowing the desired pattern to be etched into the layer 30 without damaging the surface of the Bragg mirror.

In operation, the mask receives extreme ultraviolet light, notably at a wavelength of 13.5 nm, focused by an optical system generally operating in reflection. The exposed zones of the mirror reflect the light towards projecting optics that project it onto a flat structure comprising a layer that is to undergo photolithography. The mirror zones covered by the absorbent layer do not reflect light. The projecting optics in general project an image reduced by a ratio of four.

Figure 2:
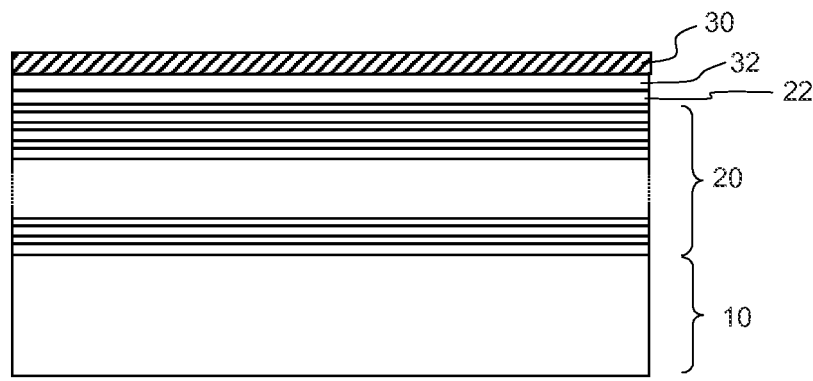
FIG. 2 shows the mask blank produced before production of the mask itself.

Before the photolithography pattern is etched, the assembly made up of the substrate 10, the mirror 20, the buffer layer 32 and the uniformly deposited absorbent layer is called a mask blank. A mask blank is shown in FIG. 2. If the mask blank comprises defects, these defects reduce the quality of the final mask. The defects may be surface defects (for example a hole in the uniform layer 30). Bulk defects, in the multilayer 20 or under the multilayer 20 or on the surface of the substrate, cause phase defects and may also affect the quality of the mask. These defects cannot be repaired, or are difficult to repair, once the mask has been produced.

At the present time, defects of more than 60 nanometers in size are considered to be completely unacceptable and a mask should not comprise more than 0.01 defects of this size per $cm^2$.

To produce a complete structure, for example an integrated microelectronic circuit comprising semiconductor, conductive or insulating layers etched with respective patterns, and comprising semiconductor zones doped with respective implantation patterns, a set of N masks (N>1) is required. The patterns projected onto the structure in successive photolithography steps, using each of the N masks, superpose very precisely in order to form the final structure. The set of masks may comprise, by way of example, 8 to 15 masks for critical levels; the other levels will be produced, for example, using deep ultraviolet (DUV) lithography, essentially for economical reasons.

To prevent the production of defect-containing masks, the surface of the mask blanks is in general inspected before they are etched and mask blanks containing defects are scrapped.

According to the invention, in order to obtain a set of N masks for producing a structure via at least N (N being an integer greater than 1) EUV photolithography operations, first a map of the defects of all the mask blanks produced is created. In other words, the exact position of each defect of a size larger than a given value (for example 30 nanometers, though a smaller value will possibly be used if a larger margin of safety is desired) is determined with precision using an inspection machine. The X and Y coordinates of the positions of the defects are defined with respect to a working zone common to all the mask blanks. This working zone is in practice defined with respect to the edges of the mask, the latter generally being rectangular. It may also be defined with respect to alignment marks produced beforehand on the mask blank. In other words, the working zones of the N masks are identical and rigorously superposed in the EUV photolithography operations.

A respective map of the positions of the defects with respect to the common working zone is created for each of the mask blanks of the set of N masks. Next, the positions of the defects in the N mask blanks are transposed to the same working zone. Thus, all the defects corresponding to the N mask blanks of the set are positioned in the same coordinate system and in a single working zone common to all the mask blanks. In other words, a concatenated map of the positions of the defects in the N mask blanks is created.

A defect zone is associated with each defect observed during inspection. This zone is preferably rectangular. It is sufficiently large to completely surround the defect in its entirety while taking uncertainty in the measurement of the position of the defect into account. It has a location with X and Y coordinates in the common coordinate system. The defect zone may have a size that depends on the size of the observed defect, but all the defect zones may also have a single standard size, even if it means that a large defect is represented by a number of juxtaposed defect zones.

N layouts are produced for the required masks depending on the electronic circuitry, or any other structure, to be produced using the set of N masks. The design rules used to produce the layouts include not only the design rules conventionally used in the field of microstructure design, but also exclusion or bypass rules specific to the observed defects. The principle is to prevent critical layout elements (or indeed any layout element) from being placed in the defect zones defined in the concatenated map. Critical elements are in practice any element with very thin layout features, and for which a defect could degrade the functionality of the structure produced.

As a concatenated map is used in which all the defects in the N mask blanks are transposed to the same working area, it is excluded, for a given mask, to place layout elements in a defect zone not only if the mask blank that will be used to make this mask comprises a defect, but also if the defect does not originate from this mask blank but from another mask blank that is not intended to produce this mask.

The complete set of masks may then be used to produce structures via successive photolithography steps. Each mask blank may be used to produce any of the set of N masks since its own specific defects will be taken into account in the layout of all the masks in the set.

Blocks of a substantial size that it would be preferred not to redesign will be placed first on the set of masks (EUV masks and DUV masks). A typical example is a clock unit.

Next, the circuit will be designed by incorporating, into the design rules, defect zones that must be avoided.

Figure 3:
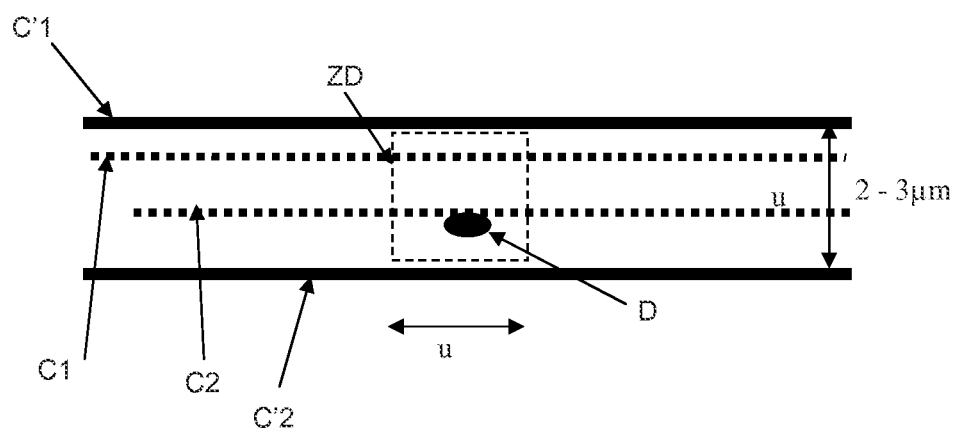
FIG. 3 shows a defect detected in the surface of a mask blank, and the conductive tracks to be produced in a conductive layer, and the actual track produced taking account of the position of the defect.

FIG. 3 shows a defect D, a defect zone ZD, which is here a square of side length u, encircling the defect D. This square may, for example, have a side length of 2 to 3 microns. It defines a layout exclusion zone.

By way of example of how this exclusion zone may be handled: if one of the masks of the set of masks is used to define a network of metal conductors, design rules ensure that none of the conductors passes through the zone ZD. Here, two conductors C1 and C2 are shown, and the design software program excludes passage through the zone ZD independently of whether the defect was observed on the mask blank that will be used to produce the mask for the metal conductors or on another mask blank in the same set.

Assuming that in the absence of a defect the layout design software package would employ the conductive tracks C1 and C2 (dotted lines), the modified design rules take account of the presence of the zone ZD and define replacement tracks: conductors C'1 and C'2 (solid lines), that are further away from each other than the conductors C1 and C2 and therefore pass either side of the defect zone ZD.

Figure 4:
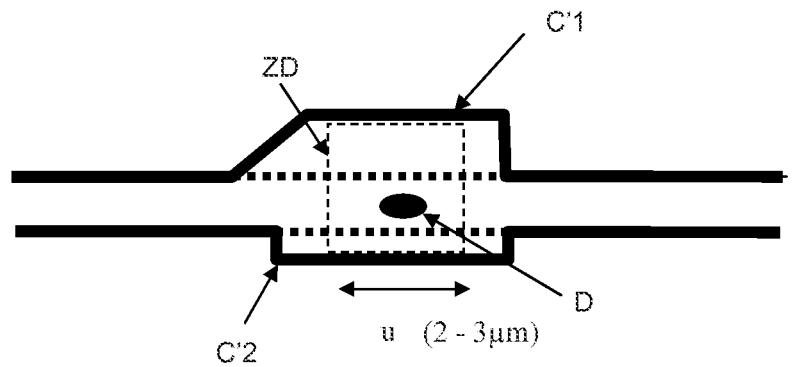
FIG. 4 shows an example modification to a conductive track.

In FIG. 4, the exclusion is obtained by modifying, locally, the path of the conductors so that they bypass the zone ZD before returning to their normal path (the dotted lines show the path the conductors would take if the defect were not present).

Figure 5:
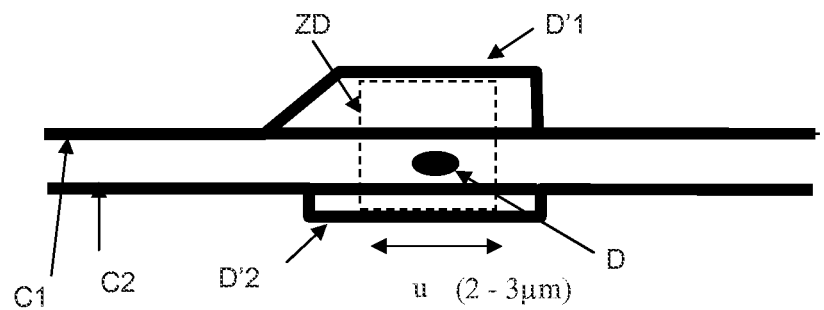
FIG. 5 shows another example modification to a conductive track.

FIG. 5 shows a variant, applicable to conductive tracks, in which the original conductor C1, C2 running through the defect zone is preserved, but an additional bypass (D'1, D'2) is added to it, the additional bypass passing around the defect zone and re-establishing electrical continuity in the case where the defect results in the conductor C1, C2 being severed. In other words, the design rule does not modify the track but adds another bypass track. This rule is applicable mainly, or sometimes exclusively, to conductive tracks.

Figure 6:
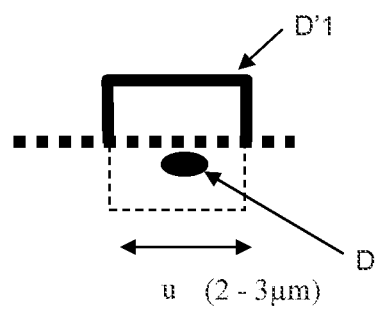
FIG. 6 shows a standard bypass cell that may be used in the design rules to take account of a defect on the path of a conductor.

The bypass may be a standard U-shaped conductor, such as shown in FIG. 6, having a length u of a few microns between the arms of the U, and the ends of which are applied to any conductor that is liable to encounter a defect. The design rule is then the addition of a standard bypass that bypasses the defect.

The mask design rules will therefore preferably include exclusion cells and standard bypass cells.

In the design of integrated circuit layouts, it is known that most often elementary blocks selected from a library are used. For example, a clock will be designed using N sets of masks obtained from a library. Preferably, in the case of a defect located in the zone where a clock would have been placed, the mask layouts defining the clock will not be redesigned in detail but the entire block will be moved and placed outside of the various defect zones determined via visual inspection of the mask blanks. This solution is simpler for small functional blocks. For larger blocks it is preferable to redesign the interior of the block, thereby avoiding the defect zones.

On account of the small size (smaller than 10 microns square) of the exclusion zones, it will in general be possible to place the blocks so that they do not encroach on the exclusion zones.

Consideration was given, above, to the case where all the defects in all the mask blanks used to produce a complete set of masks for producing a structure, for example a microelectronic circuit, were collated. However, the set of masks could be considered to comprise N critical masks (from the point of view of the size of the features) and other less critical masks, for example masks for forming insulating oxide zones or masks for implanting doped wells. In this case, it is possible for only the defects in the N critical mask blanks to be taken into account, defects in the less critical masks being excluded. However, this of course assumes that the mask blanks allocated to the less critical operations have not had their defects identified and collated. There is no need for the other mask blanks to be allocated to any particular mask since all their defects have been concatenated.

The case where the lifetime of the masks is shorter than the amount of time for which the structures are to be manufactured, or in other words the case where it will be necessary to manufacture new masks to replace worn masks, may also be of interest. In this case, replacement mask blanks may be manufactured in advance and inspected for defects in order to collate them with those of the initial set of masks. Design of the mask layouts will take into account not only defects in the mask blanks of the initial set, but also defects in the mask blanks of one or more additional sets and sets for replacing masks that may eventually get broken or worn out. Taking this precaution means that there is no need to redesign the masks to take account of defects in new mask blanks. It will be possible to replace any mask of the set with any one of the additional mask blanks kept in reserve.

Lastly, it is possible for a given mask to contain layouts for a number of identical integrated circuit chips, for example four chips. In this case, the same mask layout will preferably be used for all the chips rather than designing four chip layouts that are slightly different from one another due to exclusions and bypasses resulting from the observed defects. Thus, a common working zone corresponding to a single chip will contain all the defects observed in areas corresponding to the other chips of a given mask. The mask design software package will take account of all the defects corresponding to the various zones of the mask blank, transposed to the area corresponding to a chip. Thus, the exclusion-zone-corrected layout may be used for all the chips even though the defect zones avoided in the layout are not necessarily due to a mask blank defect located in the corresponding chip zone.

To give a numerical example: if there are N=10 critical mask levels, and each blank mask contains about 100 defects, then there are 1000 defect zones to be avoided. The defects may be considered to be a few tens of nanometers to about 200 nanometers in size. Adopting an exclusion of 1 micron on either side of the defect, i.e. an area of 4 microns square, about 4000 microns square will have to be excluded. The mask is generally at least 10 cm by 10 cm in size. The area excluded from the layout is therefore negligible. However, if there are 10 chips per mask and the defects corresponding to the other chip zones are collated in a given chip zone, the excluded area instead becomes 40 microns square, but remains about 0.0002% of the total area and therefore extremely small. Furthermore, if the defects in about ten sets of mask blanks are collated, with a view to the future replacement of the masks, the area excluded from the layout does not exceed 0.002%, which is very small.

The invention claimed is:

1. A method for producing a set of N masks for producing a structure via at least N photolithography operations, comprising:
   providing a set of N mask blanks possibly containing defects, N being an integer greater than 1;
   producing an individual map of positions of the defects in each mask blank using an inspection machine;
   producing a concatenated map of the defects in all of said N masks by transposing, to a given useful zone common to all the masks, the positions of the defects detected during mapping of the N mask blanks;
   defining individual defect zones each associated with a respective defect and encircling said defect;
   producing, depending on design rules and on the structure to be produced, an electronic version of layouts of the N masks, wherein the layouts are modified taking account locally, in the design rules, of the existence of each defect in the concatenated map in order to prevent critical elements from being placed in defect zones; and
   producing each of the N masks from any one of the N mask blanks and with a respective layout thus obtained.

2. The method according to claim 1, wherein the set of N masks serves to produce, in one operation, P identical structures, and the concatenated map for the mask area corresponding to a single structure includes the relative positions of the defects in the mask-blank areas corresponding to the P−1 other structures.

3. The method according to claim 2, wherein the concatenated map includes the defects in a number of mask blanks higher than N, with a view to manufacturing masks for replacing worn masks without modifying the layouts of the masks produced.

4. The method according to claim 3, wherein the layout modification associated with the presence of a defect is the transfer of a circuit block to a location outside of the defect zones.

5. The method according to claim 3, wherein the layout modification associated with the presence of a defect is the replacement of a track passing through a defect zone with a track passing around the defect zone.

6. The method according to claim 3, wherein the layout modification associated with the presence of a defect is the replacement of a track passing through a defect zone with a track passing around the defect zone.

7. The method according to claim 3, wherein the layout modification associated with the presence of a defect is the addition of a bypass that does not pass through the zone associated with the defect, without removing the track passing through the zone associated with the defect.

8. The method according to claim 2, wherein the layout modification associated with the presence of a defect is the transfer of a circuit block to a location outside of the defect zones.

9. The method according to claim 2, wherein the layout modification associated with the presence of a defect is the replacement of a track passing through a defect zone with a track passing around the defect zone.

10. The method according to claim 2, wherein the layout modification associated with the presence of a defect is the addition of a bypass that does not pass through the zone associated with the defect, without removing the track passing through the zone associated with the defect.

11. The method according to claim 1, wherein the concatenated map includes the defects in a number of mask blanks higher than N, with a view to manufacturing masks for replacing worn masks without modifying the layouts of the masks produced.

12. The method according to claim 11, wherein the layout modification associated with the presence of a defect is the transfer of a circuit block to a location outside of the defect zones.

13. The method according to claim 11, wherein the layout modification associated with the presence of a defect is the addition of a bypass that does not pass through the zone associated with the defect, without removing the track passing through the zone associated with the defect.

14. The method according to claim 1, wherein the layout modification associated with the presence of a defect is the transfer of a circuit block to a location outside of the defect zones.

15. The method according to claim 1, wherein the layout modification associated with the presence of a defect is the replacement of a track passing through a defect zone with a track passing around the defect zone.

16. The method according to claim 1, wherein the layout modification associated with the presence of a defect is the addition of a bypass that does not pass through the zone associated with the defect, without removing the track passing through the zone associated with the defect.

* * * * *